April 28, 1959 W. M. HALLIDY 2,884,549
ARMATURE CONSTRUCTION
Filed April 24, 1957

INVENTOR.
WILLIAM M. HALLIDY
BY Hudson Boughton,
Williams, David & Hoffmann
ATTORNEYS United States Patent Office 2,884,549
Patented Apr. 28, 1959

2,884,549
ARMATURE CONSTRUCTION

William M. Hallidy, Lakewood, Ohio, assignor to The Leece-Neville Company, Cleveland, Ohio, a corporation of Ohio Application April 24, 1957, Serial No. 654,933

7 Claims. (Cl. 310—183)

This invention relates to electrical motors and, more particularly, to an armature structure for a direct current series electrical motor wherein is provided a novel and improved armature winding which is effective to limit or reduce the no-load or free-running speed of the armature.

As is known in the art, the operational characteristics of a direct current, series motor are such that when a load connected to the rotating armature is decreased, the speed of rotation of the armature will increase in proportion to the change in the load. And, if the load is decreased to a very low value or is completely disconnected from the armature, the speed of the armature may be substantially increased to a dangerously high value and the motor will be objectionably noisy in operation.

Therefore, a primary object of the present invention is to provide a novel armature structure for a direct current, series electrical motor in which a desired control of the no-load armature speed is achieved by short-circuiting of certain inductor loops of the regular or conventional armature winding and without need for any specially formed or located control windings nor any additional or auxiliary control windings.

Another object is to provide such a novel armature construction for a direct current motor in which the short-circuiting of certain of the inductor loops is at a readily accessible location at or adjacent the commutator and, preferably, by a short-circuiting connection applied to lug projections of certain of the commutator segments.

Still another object of the present invention is the provision of a novel and improved armature winding for the armature structure of a direct current motor as referred to and wherein the short-circuited part comprises one or more of the coils of the armature winding which may have the ends thereof disconnected from the commutator and permanently connected together.

A further object of the present invention is the provision of an armature structure in a direct current, series electrical motor as referred to and wherein the ends of one or more of the short-circuited coils of the armature winding may be connected together directly across the commutator bars to which said ends are secured, effectively short-circuiting said coil or coils.

Yet another object of the present invention is the provision of an armature structure in a direct current, series electrical motor as referred to and wherein the electrical energy absorbed by the short-circuited part of the armature winding decreases proportionally as the driven load connected to the armature structure is increased.

Another object of the present invention is the provision of an armature structure in a direct-current, series electrical motor as characterized above and wherein the commutator bars or segments are provided with tabs or lugs to facilitate connecting the ends of the coil or coils to short-circuit the same.

Still another object is the provision of an armature winding as referred to which will enable the manufacturer to wind the armature structure for all direct-current, series wound motors in a similar manner and then provide a shorting jumper or wire which is connected across the lugs or tabs on the commutator bars to short-circuit one or more of the armature winding coils to provide the novel and improved armature winding of the present invention.

Another object of the present invention is to provide an armature structure with a novel and improved armature winding as above characterized and which is economical in its manufacture and substantially more simple in construction.

Additional objects and advantages of the present invention will be hereinafter apparent and more fully realized by those versed in the art upon reference to the following detailed description of several preferred embodiments and to the accompanying drawings forming a part of this specification and wherein.

Figure 1:
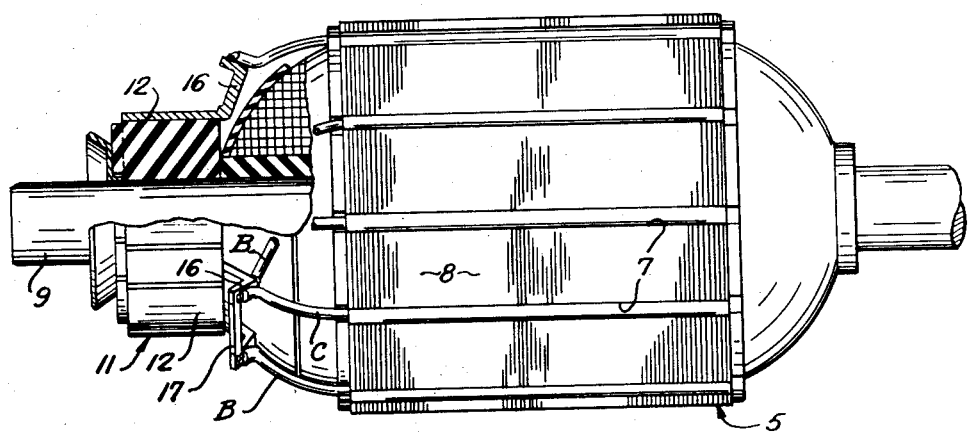
Fig. 1 is an elevational view, shown partly in section, of an armature structure for a direct current, series electrical motor embodying the present invention.
Figure 2:
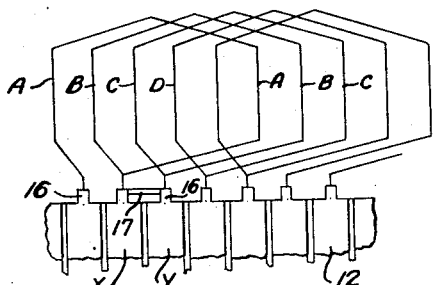
Fig. 2 is a fragmentary diagrammatic view of the armature structure of Fig. 1, and which shows one of the coils of the armature winding short-circuited directly across adjacent commutator bars or segments.
Figure 3:
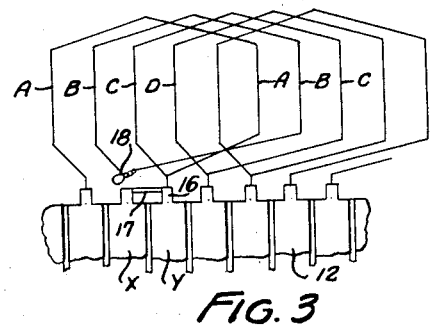
Figure 4:
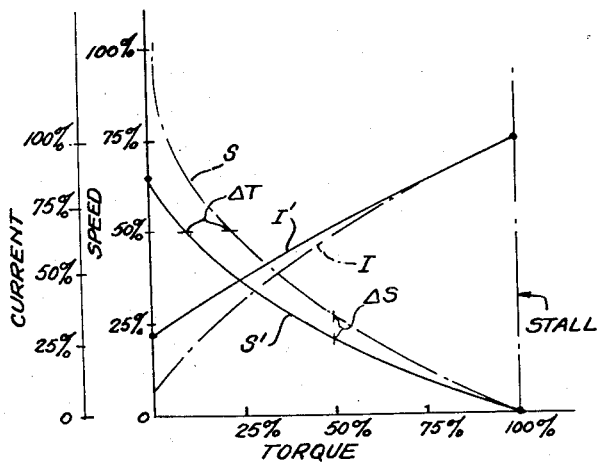

Fig. 3 is a view similar to Fig. 2, but shows a modified form wherein the ends of one of the coils of the armature winding are disconnected from the commutator and connected together to effect the short-circuiting of said coil; and Fig. 4 is a graph showing the operational characteristics of a conventional direct-current, series motor in dot-dash lines, and those of a motor employing the armature structure of the present invention being shown in full lines.

The conventional armature structure of a direct-current, series electrical motor usually includes a cylindrical armature body or core mounted on a suitable shaft and which is provided with a plurality of slots spaced about the periphery and which extend radially inwardly thereof defining core teeth therebetween. The slots are adapted to receive a predetermined number of coils usually formed of a predetermined number of turns of metallic insulated wire. One end of the shaft mounts a commutator which normally consists of a plurality of suitable metallic conductive bars or segments mounted on a suitable cylindrical base and which are insulated one from the other, and to which are attached the ends of the coils carried in the armature core or body.

The armature structure is rotatably supported within the stator frame or housing; the latter carrying the usual field winding. The armature winding is adapted to be connected in series with the field winding by means of suitable brushes engaging the commutator in a manner as is well understood in the art.

With a source of D.C. electrical energy connected across this series circuit, the inter-action between the resultant magnetic fields of flux developed in the field winding and the armature winding is operative to produce mechanical energy or a driving torque effective to cause rotation of the armature structure. And, as is understood in the art, with the armature structure free to rotate, i.e., when the latter is not connected or geared to a driven load, the transformation of electrical energy into driving mechanical energy or torque is such as to cause the speed of rotation of said armature structure to progressively increase, whereby the latter tends to "run away." And, as is previously mentioned, if said speed becomes a sufficiently high value, the motor will be objectionably noisy. Also, as is known in the art, if the speed of the rotor becomes dangerously high, centrifugal forces are developed within the rotor and tend to literally tear it apart.

The instant invention, as will become hereinafter apparent, provides the armature structure with a novel and improved winding that, when considering the mechanical energy or driving torque that is possible to be developed in a particular motor, is operative to absorb energy or create a resisting torque which effects the reduction of the no-load speed of rotation of the armature structure. Also, it will be seen that the energy absorbed or the resisting torque created is a maximum value when the armature structure is running substantially free, i.e., with little or no load being connected thereto, and decreases in proportion to the increase in the load connected to said structure.

More specifically, and with reference to the accompanying drawing, wherein like elements are designated by the same reference character, the instant armature structure includes a cylindrical core or body 5 having a plurality of circumferentially spaced slots 7 which extend radially inwardly of the body defining core teeth 8 therebetween. The armature body 5 is concentrically mounted on a suitable shaft 9, the latter of which also mounts a commutator 11 having a plurality of segments or bars 12 supported on a suitable base and which are insulated one from the other. The above construction, as is known in the art, is of conventional form and is utilized merely for purposes of illustration, it being understood that the size, shape and configuration of each of the above elements may be substantially changed when adapted for use with a motor which has a predetermined set of design parameters.

The novel and improved armature winding of the present invention is adapted to be wound or mounted on the armature core or body and comprises a plurality of coils A, B, C, etc., formed of a predetermined number of turns or loops of insulated metallic wire which are placed in the slots 7 of said armature core or body. The armature winding comprising the coils A, B, C, etc. is preferably a single continuous winding and, in accordance with the present invention, has at least one of its coils short-circuited in the manner explained hereinafter. As is well known, there are many different ways in which the coils may be placed on the armature core or body, depending upon the particular winding scheme utilized, and in the instant form, merely for purposes of illustration, one coil is to be disposed in each slot, whereas the armature span per each coil is six slots. And, in like manner, the commutator span utilized is two bars or segments, i.e., the ends of each coil are connected to adjacent bars or segments, such as commutator bars X and Y. Additionally, the commutator bars or segments are each integrally provided with an upstanding lug 16 to facilitate attaching the ends of the coils thereto, and these readily-accessible lugs are further utilized for a purpose to be presently explained.

Referring now to Fig. 2, which shows the preferred form, the coils A, B, C, etc., are placed in the slots 7 in the armature core in a manner as above described and the ends of the coil B connected to adjacent commutator bars or segments X and Y by means of the aforesaid lugs 16, are also connected together by a shorting wire or jumper 17 interconnected between the latter, whereby said coil is short-circuited. The end of the coil A attached to commutator bar X is connected through the shorting wire or jumper 17 to commutator bar Y and thereby to the coil C to complete the armature circuit. Therefore, in the instant form the armature structure includes a unitary winding spaced circumferentially about the armature core and having one of its coils, namely coil B, short-circuited by means of a shorting wire or jumper 17.

In the modified form of armature winding shown in Fig. 3, the coils A, B, C, etc., are placed in the armature slots 7 of the armature core in the same manner as above described. However, the ends of the coil B are disconnected from the commutator bars X and Y and are then connected together, as shown at 18, by welding or the like. The end of coil A that was connected to the commutator bar X in the previous form, is connected instead to the commutator bar Y, thereby retaining the continuity of the winding. The shorting wire or jumper 17 is connected across the lugs 16 of the commutator bars X and Y, thus also utilizing the commutator bar X for commutation; however, the shorting wire or jumper 17 could be omitted provided it does not noticeably affect the starting and/or running characteristics of the motor. Therefore, in the present modified form the armature structure includes a unitary winding which has one of its coils, namely coil B, completely disconnected from the commutator and then the ends of said latter coil are connected together to effectively short-circuit the same.

In each of the above described forms of armature winding, merely one coil has been shown short-circuited to obtain the resultant effect; however, by shorting out additional coils, or changing the number of turns or loops in the shorted coil and/or coils in the same manner as just described, a greater range of control of the no-load or free-running speed of the armature structure may be realized.

The improved operational characteristics of a direct-current, series motor utilizing an armature structure having the novel winding of the present invention may best be described and understood by referring to Fig. 4 of the drawings wherein is shown the speed-torque characteristic designated by the curve S, and a motor current-torque characteristic designated by the curve I, of a conventional series motor and also the same characteristics as designated by the curves S', and I', respectively, of a similar series motor, but having the armature winding of the present invention and operated under the same conditions.

The speed-torque characteristic S and the motor current-torque characteristic I of the conventional motor are well known and understood in the art, and therefore, need not be defined in any great detail. However, it may be seen, with reference to curve S, that when the load connected to the armature structure is decreased, less torque is required of the motor and the speed increases in proportion. And, that when the load is substantially decreased or completely disconnected from the armature structure, the speed of the latter increases to a very high value. Also, with reference to curve I, it will be understood that when the armature structure is running free, i.e., with no driven load being connected thereto, the motor current is a minimum value, and that, as said load is increased the motor current also increases to produce the necessary additional torque to sustain its being driven.

The operational characteristics of the motor utilizing the armature winding of the present invention, as shown by the curves S', and I', are decidedly different from those of the conventional motor, as will now be explained. The speed-torque characteristic, as designated by the curve S', is such that when the driven load connected to the armature structure is decreased, a smaller torque is required to sustain its being driven, and therefore, the speed of the armature structure increases. However, when the driven load is substantially reduced or completely disconnected from the armature structure, the speed of rotation of the latter increases instead to a finite predetermined value. The torque output of the motor having the armature structure of the present invention is also somewhat less at any selected armature speed within the operating range of said motor than that of the conventional motor; the difference being designated by $\Delta T$, which is attributed to the short-circuited coil B absorbing energy or creating a torque which resists the driving torque. And, as is seen upon comparing the curves S and S', $\Delta T$ increases in proportion to the increase in speed of the armature, which, in turn, is caused by a decrease in the driven load. Further, it is realized that when the driven load is substantially reduced or disconnected from the armature structure of the present invention, $\Delta T$ increases sufficiently to overcome the tendency of said armature structure to run away, and thereby defines the aforesaid finite maximum no-load speed. In like manner, for any selected torque output of the instant motor with respect to the conventional motor, the armature speed is less, the difference being designated by ΔS, which also signifies that energy is being absorbed or a torque is developed within the short-circuited part of the armature winding which resists the speed of said armature structure. Further significant of the armature winding of the present invention being effective to limit the speed of rotation of the armature structure, is the fact that, for any selected torque output, excepting at zero speed or stall condition, the current required to produce the driving torque is greater than that required in the conventional motor. And, at the aforesaid stall condition it is seen that the current required of either motor is substantially the same, and since the speed is zero it is realized that the short-circuited part of the armature winding functions only during the rotation of the armature structure to absorb energy or create resisting torque to limit the speed of said structure.

From the foregoing detailed description of several preferred forms of the present invention, it is realized that the armature winding is effective to limit the no-load or free-running speed of the armature structure. Also, it is realized that the armature winding of the present invention is a single winding as defined in the art, having an integral short-circuited part which is effective to absorb energy or create a torque and thereby limit the no-load speed of the armature structure. Additionally, it is seen that the armature winding of the present invention, which has an integral short-circuited part being operative as above described, is substantially more simple in construction and economical in its manufacture than armature windings heretofore utilized to obtain the same or equivalent operational characteristics.

It is also realized that with the readily accessible lugs on the commutator bars, the armature may be constructed in a standard way with a conventional winding and the short circuit is then applied through said lugs to one or more coils of said winding when no-load speed control is desired.

Having thus described several preferred forms of the present invention, it is understood that the inventive concepts disclosed herein are susceptible of various modifications without departing from the scope thereof as defined in the appended claims.

Having thus described my invention, I claim:

1. In an armature for a direct current series motor; a core; a single continuous armature winding carried by said core; and means permanently short-circuiting a portion of said winding to provide no-load speed control for said armature.

2. In an armature for a direct current series motor; a core; a single continuous armature winding comprising a plurality of coils carried by said core; and means permanently short-circuiting at least one of said coils to provide no-load speed control for said armature.

3. An armature as defined in claim 2 and including a commutator having segments providing terminals for the coils, and wherein said one of the armature coils is short-circuited at a point adjacent to but spaced from the commutator to provide no-load speed control for the armature.

4. An armature for a direct current series motor having a core and a commutator; a conventional armature winding carried by said core and connected to said commutator, and means short-circuiting a portion of said conventional winding at said commutator to provide no-load speed control for said armature.

5. In an armature for a direct current series motor; an armature body and a commutator having a plurality of conductive segments; an armature winding carried by said armature body comprising a plurality of coils having leads connected to said commutator segments, and a short-circuit connection joining certain of said commutator segments to short-circuit at least one of said coils to provide no-load speed control for the armature.

6. In an armature for a direct current motor, an armature body, a commutator comprising commutator segments having projecting lugs, a winding on said armature body and having leads connected with said lugs, and a short-circuit connection joining certain of said lugs and short-circuiting a portion of said winding.

7. In an armature for a direct current series motor; a core, a commutator provided with a plurality of commutator segments; an armature winding carried by said core comprising a plurality of coils one of which is short-circuited and separate from said commutator and effective to provide no-load speed control for the armature, lug means on each of the commutator segments for connecting the ends of the remaining coils to the latter, and conductor means interconnecting the segments of said commutator to which the ends of the short-circuited coil would normally be attached to cause said last named commutator segments to be effective for commutation.

References Cited in the file of this patent

UNITED STATES PATENTS 2,768,317     Porter _____ Oct. 23, 1956